(12) United States Patent
Gu et al.

(10) Patent No.: US 6,584,156 B1
(45) Date of Patent: Jun. 24, 2003

(54) LSI ARCHITECTURE AND IMPLEMENTATION OF MPEG VIDEO CODEC

(75) Inventors: Mingning Gu, San Jose, CA (US); Chenhui Feng, Cupertino, CA (US)

(73) Assignee: Stream Machine Company, Fremont, CA (US)

( * ) Notice: Subject to any disclaimer, the term of this patent is extended or adjusted under 35 U.S.C. 154(b) by 0 days.

(21) Appl. No.: 09/118,669

(22) Filed: Jul. 17, 1998

(51) Int. Cl.[7] .............................. H04B 1/66; G06F 7/50; G06K 9/36
(52) U.S. Cl. ......................... 375/240.18; 375/240.25; 708/670; 382/233
(58) Field of Search ................ 375/240.18, 240.16, 375/240.25, 240; 348/397.1, 384.1, 385.1, 403.1, 408.1; 382/233, 250; 708/491, 703, 401, 402, 670, 201

(56) References Cited

U.S. PATENT DOCUMENTS

| | | | | |
|---|---|---|---|---|
| 5,305,249 A | * | 4/1994 | Yoshida | 708/670 |
| 5,452,466 A | * | 9/1995 | Fettweis | 712/36 |
| 5,563,813 A | * | 10/1996 | Chen et al. | 708/201 |
| 5,801,975 A | * | 9/1998 | Thayer et al. | 708/402 |
| 6,038,580 A | * | 3/2000 | Yeh | 708/402 |
| 6,148,034 A | * | 11/2000 | Lipovski | 375/240.16 |

OTHER PUBLICATIONS

Sun, M.T., et al., "A Concurrent Architecture for VLSI Implementation of Discrete Cosine Transform," *IEEE Transactions on Circuits and Systems*, vol. CAS–34, No. 8, Aug. 1987 (pp. 992–994).

* cited by examiner

Primary Examiner—Gims S. Philippe
(74) Attorney, Agent, or Firm—Steven Lin, Esq.

(57) ABSTRACT

Flexible VLSI architecture implements of MPEG video processing unit (VPU) for encoding and decoding. In encoding mode, VPU performs compression operations on digitized video input per MPEG standard; and in decoding mode, VPU performs decompression operations on video bitstream per MPEG standard. VPU modules include: Discrete Cosine Transformation (DCT), Inverse Discrete Cosine Transformation (IDCT), Quantization (QNT), Inverse Quantization (IQ), Variable Length Encoding (VLC), Variable Length Decoding (VLD) and Motion Compensation (MC). VPU functions in half duplex, and hardware modules are shared between encode/decode modes. Architecture provides low-cost, flexible and efficient solution to implement real-time MPEG codec. Specific system configuration is not required, and general interface supports various operating conditions.

22 Claims, 5 Drawing Sheets

LSI ARCHITECTURE AND IMPLEMENTATION OF MPEG VIDEO CODEC

BACKGROUND OF INVENTION

1. Field of Invention

Invention relates to digital video processing, particularly to semiconductor chip architecture and implementation of digital video compression and decompression.

2. Description of Background Art

Video data transmission requires wide bandwidth. If video data are stored and transferred in original format, recording medium with large capacity and transmission medium with wide bandwidth is needed. To obtain economic and efficient system for storing and transferring video data, video image generally needs to be compressed to reduce redundant and trivial information.

Since becoming international standard in 1994, MPEG-1/MPEG-2 has been adopted for many applications. As digitalization of video signal is increasingly more popular, and available bandwidth for handling large amount of data is seemingly always limited, MPEG technology provides general solution which has actually become common technology for coding digital video. There are many implementations of MPEG algorithm available, both in software and hardware. Software implementation of MPEG is generally more cost-effective than hardware implementation. While hardware implementation generally has better performance in real-time system.

Discrete Cosine Transform (DCT) and Inverse Discrete Cosine Transform (IDCT) refer to important video compression elements of MPEG standard. Hardware implementation of DCT/IDCT takes considerable amount of silicon design area. Speed of DCT/IDCT affects video system processing ability. Architecture of DCT/IDCT may compromise between area and processing speed determined by specific applications of chip. Since introduction of DCT/IDCT in 1970's, much research has been performed on algorithms and designs for computing the DCT/IDCT.

Therefore, there is need for improved integrated chip design architecture and implementation for MPEG video codec application.

SUMMARY OF INVENTION

The invention resides in flexible VLSI (Very Large Scale Integration) architecture and implementation of video codec (coding/decoding) logic. Implementation of invention in VLSI is termed as Video Processing Unit (VPU). VPU operates in two modes: video encoding or decoding. In encoding mode, VPU receives digitized video input and compresses according to MPEG standard. In decoding mode, VPU receives MPEG video bitstream and decompresses according to MPEG standard. Supporting modules such as DRAM controller and motion estimation logic facilitate real-time MPEG codec processing. In particular, the invention presents a novel approach for implementing DCT and IDCT using the same hardware. The approach minimizes logic, while processing speed can meet MPEG MP@ML requirements. Preferably, there is no different set of logic for row and column processing.

DETAILED DESCRIPTION OF PREFERRED EMBODIMENT

The preferred embodiment comprises one or more functional modules for implementing digital video encoder and/or decoder signal processing elements in single or multi-chip integrated circuit, associated hardware electronics, firmware, software or other substantially equivalent functional components, according to and in substantial compliance with one or more previously or currently published versions of industry standard specifications, such as Motion Picture Experts Group (MPEG), which are hereby incorporated by reference as appropriate for assisting those skilled in such art for implementing present mode described herein.

It is contemplated that present video encoding and/or decoding system preferably employs one or more digital signal processors, microprocessors, controllers, central processing unit (CPU), or other functionally equivalent general or proprietary hardware, firmware or software computing and storage modules for implementing, executing, coordinating, or otherwise signal-processing functionality specified herein.

Figure 1:
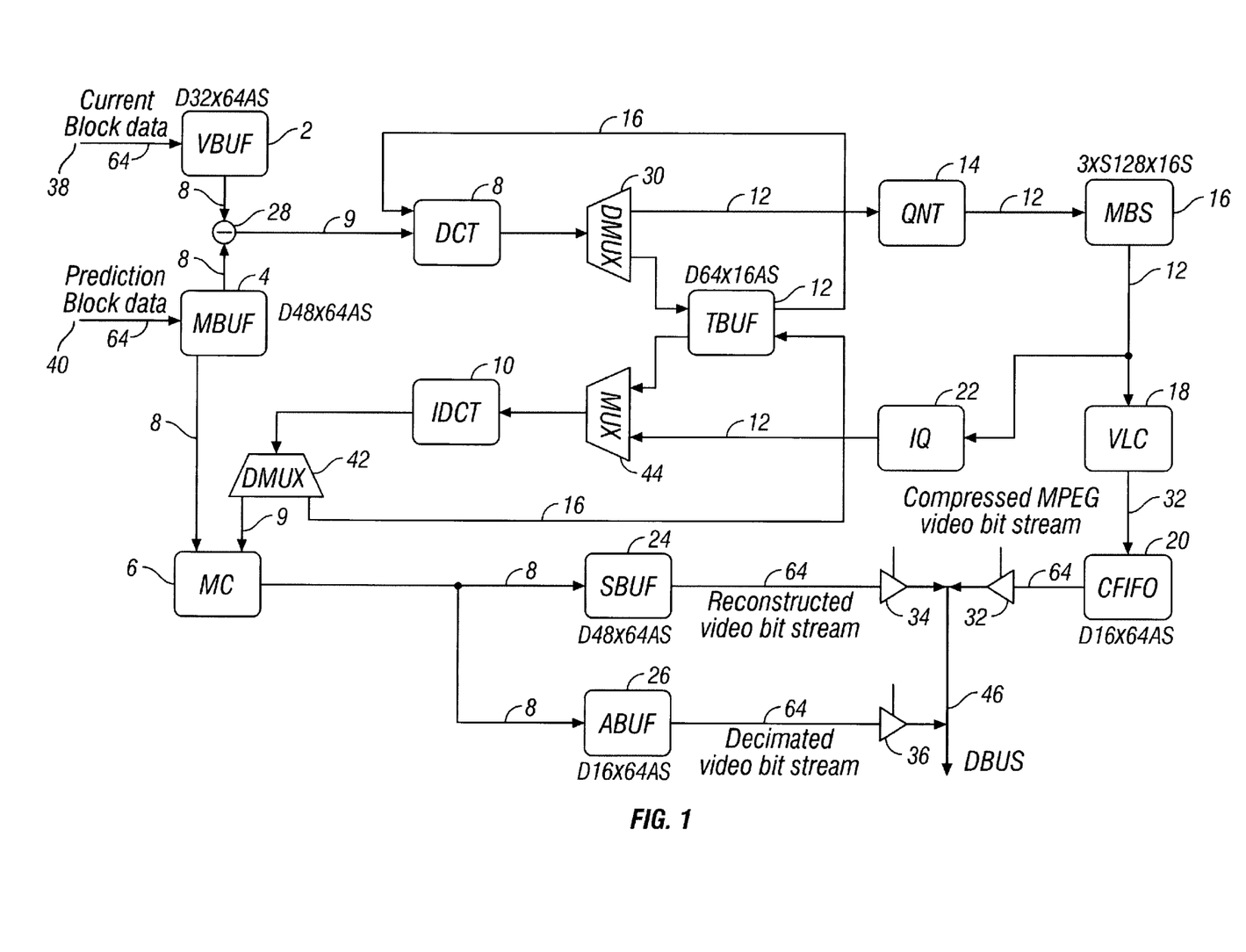
FIG. 1 is a system block diagram for digital video encoding according to the present invention.
Figure 2:
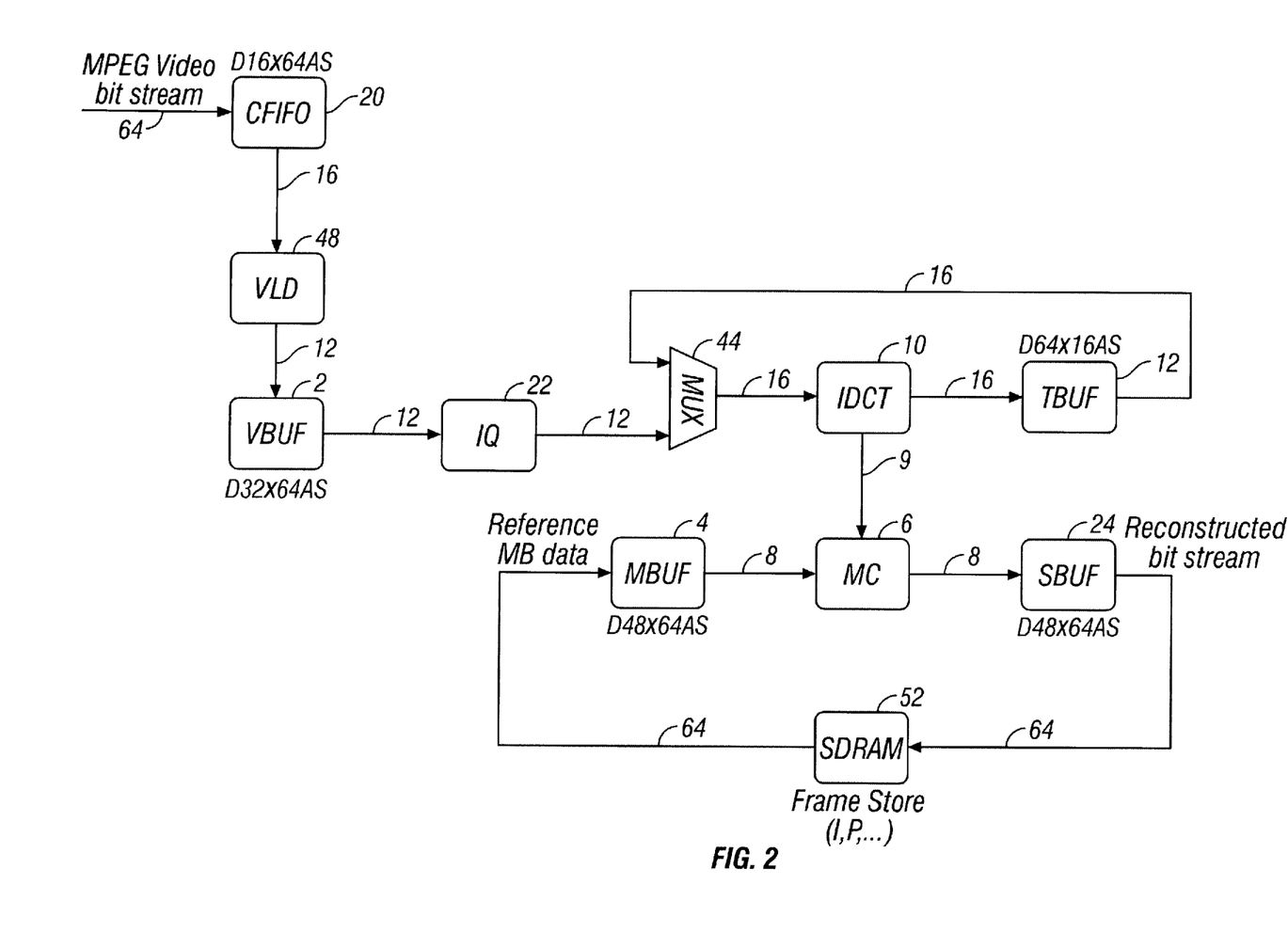
FIG. 2 is a system block diagram for digital video decoding according to the present invention.

Video Processing Unit (VPU) functional modules are shown in FIG. 1 (for encoding mode) and FIG. 2 (for decoding mode). VPU is a half-duplex encoder and decoder (codec) for processing digital signals for video encoding or decoding. Generally, VPU encoding compresses incoming YUV digital video signal into a MPEG video bitstream compatible with MPEG video format, such as MP@ML. Additionally, VPU decoding task decompresses MPEG video bitstream into YUV format compatible signal with MPEG video format, such as MP@ML.

VPU may be monolithic or partitioned into different modules. Actual module partitioning depends on limitation of desired functionality and Electronic Design Automation (EDA) tool actually used for system and/or circuit design. Here, principal functional modules include: Discrete Cosine Transformation (DCT) 8, Inverse Discrete Cosine Transformation (IDCT) 10, Quantization (QNT) 14, Inverse Quantization (IQ) 22, Variable Length Coding (VLC) 18, Variable Length Decoding (VLD) 48, and Motion Compensation (MC) 6. Preferably, foregoing functional modules operate in compliance with industry standard specification, such as MPEG 2.

Since VPU operates as a half-duplex codec, hardware and other functional modules may be shared between encoding and decoding modes. VPU architecture takes advantage of sharing opportunity and provides low-cost solution to implement a real-time MPEG codec system. A preferred implementation has no specific requirements for system configurations. Generic interfacing capability uses buffers for VPU input and output vectors.

In the encoding mode, VPU receives two primary inputs from supporting circuits. Primary digital signal inputs are current 8×8 pel macro-block and prediction 8×8 pel macro-block data 38, 40, as shown in FIG. 1. The difference of two macro-block data is quantized, transformed, and coded. VPU encodes an entire video bitstream from slice layer as well as other lower layers. Parameters from higher system and video layers are passed from supporting circuits. Parameters are used to set-up control registers for the encoding operation. RISC CPU or other equivalent digital controller or signal processor may coordinate operations between VPU and supporting circuits. When the bitstream above the picture layer is encoded, CPU calculates total bit count of generated bitstream and asserts the VPU enable signal.

When VPU starts encoding, VPU system parameters are set properly. VPU sends prediction block data request and current luminance block data request to motion search unit. Prediction macroblock data from motion search unit are written into MBUF 4. Current luminance macroblock data from motion search unit are written into VBUF 2. When data in MBUF 4 and VBUF 2 are available, difference functionality 28 of corresponding prediction pel and current pel are calculated and sent to DCT 8 unit. After the first luminance current block is processed, VPU sets first chroma current block (U block) data request to SDRAM 52, shown in FIG. 2. After the second current luminance block is processed, VPU sets second chroma current block (V block) data request to SDRAM 52. VBUF 2 may be implemented as 4- or 6-block two-port RAM.

DCT 8 is implemented in two-pass operations. First pass is applied to row of pels of block data. Difference 28 of current block data and prediction block data are passed from MBUF 4 and VBUF 2. DCT 8 input pel sequence is constructed wherein when two pels are available, DCT 8 outputs data, without waiting for a third input pel. Input data signal for first-pass DCT 8 is a 9-bit vector, and output data from first-pass DCT 8 is a 16-bit vector. Results from first pass of DCT 8 are written through multiplexer 30 into transpose buffer (TBUF) 12. TBUF 12 holds entire block of video bitstream signal data, as second-pass DCT 8 starts the computation when row DCT 8 finishes an entire block.

After the first DCT pass finishes, DCT 8 fetches column data from TBUF 12 and starts a second-pass operation. Second pass is applied to column pel of block data. Control logic of TBUF 12 enables matrix transpose functionality between first- and second-pass operations. Input data signal for second-pass DCT 8 is a 16-bit vector, and output data signal from second pass DCT is a 12-bit vector. Results from the second pass is sent through multiplexer 30 to QNT 14 module for pel quantization, then further signal processing by MBS 16, VLC 18 and CFIFO 20.

In accordance with important aspect of present invention, first- and second-pass of DCT 8 share the same hardware and associated software or firmware implementation. DCT 8 module uses numerical algorithm with 12-bit accuracy for constants. Preferred throughput of DCT is 128 cycles. Row DCT has 4-cycle latency and takes 64 cycles to complete. The result of row DCT 8 is a 16-bit vector with 4-bit fraction accuracy. Preferably, there is no or substantially minimized latency for the second pass, and throughput is preferably 64 cycles. Final results from DCT 8 are truncated to 12 bits with zero-fraction accuracy.

QNT 14 starts operation when results of second pass of DCT 8 are available. QNT 14 takes 12-bit vector from DCT 8 through multiplexer 30 and divides by quantization scale read from intra_quantization or non_intra_quantization matrix provided in digital storage, depending particularly on specified parameter, such as mb_intra parameter. Results of such division are divided by mquant parameter.

Actual dividing operation is implemented preferably by a ROM look-up table in digital storage memory for mantissa and exponent, or other functionality equivalent signal-value dividing technique. To compromise between accuracy and area values, mantissa and exponent may be allocated 11 bit and 5 bit respectively. ROM access is pipelined for relatively fast signal processing. QNT 14 results are written into MBS 16.

MBS 16 implementation is logically a 6-block size RAM. Each block has 64 entries. Data signals from MBS 16 are sent to IQ 22 and VLC 18 for signal processing. There are two differences in way for MBS 16 to send data to VLC 18 and IQ 22. The first difference functionality arises when MBS 16 holds 6 block data as VLC 18 starts computation when specified information, such as cbp value, is available. The cbp information is generated after QNT 14 processes 6 block data. While IQ 22 starts when valid data is in MBS 16.

The second difference functionality arises when VLC 18 receives a 6 block data in order of Y0, . . . , Y3, U, and V, whereas IQ 22 may not have such requirement. In system design, IQ 22 preferably has tighter timing constraint than VLC 18. With such required constraints, MBS 16 is preferably implemented in 3 chunks or partitions of 128×12 single port RAM. This allows VLC 18 and IQ 22 to access MBS 16 at the same time.

VLC 18 encodes macroblock header first, followed by block data encoding. Macroblock header data is passed to VPU from motion search unit. Motion search unit determines the type of current macroblock by comparing prediction macroblock. VLC 18 searches corresponding variable length code for each macroblock header data. For block data encoding, VLC keeps distance between two non-zero pel data, and finds corresponding variable length code for specified distance and value of non-zero pel. MBS 16 module sends block data to VLC in either zig-zag or alternate scan order. Encoded macroblock header and block data from VLC is passed to DRAM via CFIFO 20.

IQ 22 takes data from MBS 16 and performs two multiplication operations on incoming pel data, i.e., one for mquant, and other operation for quantization scale from intra-quantization or non-intra-quantization matrix. Physical multiplier circuit or functionally equivalent multiplier module may be shared with QNT 14 module.

IDCT 10 receives output signal through multiplexer 44 from IQ 22 and performs first processing on row pel data bitstream. Results from first-pass IDCT 10 are 12-bit vectors and saved through multiplexer 42 into TBUF 12. After first pass finishes, IDCT 10 reads pel data through multiplexer 44 from TBUF 12 and performs second processing on column pel data. Results from second-pass IDCT 10 is sent through multiplexer 42 to MC 6. Hardware and any other associated firmware and/or software used for IDCT 10 may be shared effectively with DCT 8 module.

IDCT module 10 uses numerical algorithm with a 12-bit accuracy for constants. Accuracy of algorithm is tested against industry standard requirements, such as IEEE1800, and passes such numerical accuracy requirements. Row IDCT 10 has 4-cycle latency and preferably takes 64 cycles to finish. Result of row IDCT 10 has a 16-bit width with 4-bit fraction accuracy. For the second pass, IDCT 10 fetches data through multiplexer 44 from TBUF 12 and performs similar operations as 1D of column IDCT 10. There is no latency for the second pass, and throughput is preferably 64 cycles. Final results from DCT 8 are truncated to 9 bits with zero fraction accuracy.

MC 6 adds prediction block data to IDCT 10 signal results provided through multiplexer 42. If picture type is either Intra or Predictive, results of MC 6 are saved in SDRAM 52 as reference picture for other pictures. Performance analysis results of chip SDRAM 52 may show motion search unit and occupy much of SDRAM bandwidth. To reduce motion search unit bandwidth, MC 6 takes average luminance pel data in case of I or P picture. Averaged results are written from MC 6 into luminance average buffer (ABUF) 26.

Once MC 6 processes luminance blocks, MC 6 sets data transfer requirement to DRAM controller to provide and transfer luma data from SBUF 24 to SDRAM 52. Chroma data transfer from SBUF 24 to SDRAM 52 may use another service. As shown, SBUF 24 generates reconstructed video bit stream, ABUF 26 generates decimated video bit stream, and CFIFO 20 generates compressed MPEG video bit stream, which bitstreams respectively may be applied to tri-statable buffers 34, 36, 32 coupled to DBUS 46.

Referring to FIG. 2, VPU in decoding mode decodes the substantial entirety of MPEG-compressed video bitstream from slice layer downwards. Parameters from higher level system and video layers are passed from CPU. After control registers are set by system CPU, VLD 48 receives enable signal from CPU. Compressed MPEG video bitstream is passed from DRAM to CFIFO 20. CPU or other control unit informs VLD 48 location of first slice start code. VLD 48 fetches data from CFIFO 20 and starts decoding process, then continues decoding for the whole picture represented in received digital video bitstream. Once VLD 48 detects start code other than slice start code, it transfers decoding operation to control unit.

There are two kinds of outputs from VLD 48. One output signal is decoded block pel data, and the other signal is macroblock motion vector information. Decoded block data are written into VBUF 2. After a block of data is available, IQ 22 starts operation by fetching data from VBUF 2. Results of IQ 22 are passed through multiplexer 44 to IDCT 10. IDCT 10 takes such multiplexed data from IQ 22 and results are written into TBUF 12.

After IDCT 10 finishes the first-pass operation, it takes data from TBUF 12 and starts the second-pass operation. Second-pass results are passed by IDCT 10 to MC 6. Macroblock motion vector information signal is used to fetch reference block data from SDRAM 52. Reference block is saved from SDRAM 52 in MBUF 4. When data from MBUF 4 and IDCT 10 are ready, MC 6 starts processing operation and writes result data into SBUF 24. SBUF 24 sets-up request and passes data to SDRAM 52.

VLD 48 decodes video bitstream preferably from picture layer further to lower layers. Compressed video data signal are divided effectively in two parts: MB header (MBH) data and block data. In particular, to decode MBH, parameters from picture layer are higher layers, such as f_code, intra_dc_precision, picture_structure, and picture_type, are obtained from CPU or control unit on per-picture basis. Decoded MBH parameters, such as motion vectors, macroblock_type, and dct_type, are used to fetch reference block data signal from SDRAM 52. Uncompressed block data may then be passed to VBUF 2 after re-ordering according to zig-zag or alternate scan order.

In encoding mode, IQ 22 takes block data from MBS 16. In decoding mode, IQ 22 takes data from CFIFO 20. In both cases, IQ 22 performs two multiplication functions for every pixel, i.e., one operation for quantization matrix (either intra or non-intra), and another multiplication for mquant. In the first cycle, data from MBUF 4 are multiplied by quantization matrix. In the second cycle, the result from first cycle is multiplied by mquant. The final result is written into TBUF 12. Furthermore, two multipliers are shared with QNT 14.

For decoding operations, MC 6 reads prediction data signal from MBUF 4 and prediction error data signal from MBS 16. MC 6 then adds two types of data and truncates to range [0 . . . 255]. Results are written to SBUF 24.

In general, therefore, the present invention provides a flexible integrated system or circuit (i.e., VLSI/LSI) architecture for implementing video processing unit (VPU) for digital signal encoding and decoding according to industry digital compressed video signal processing standard, such as MPEG-2.

Preferably, VPU functions in half duplex, whereby hardware and any associated firmware or software modules are shared between encode/decode modes. Accordingly, innovative architecture provides low-cost, flexible and efficient solution to implement real-time, pipelines, single-cycle MPEG codec. Additionally, specific system configuration is not required, and general interface supports various operating conditions.

In particular, the present approach effectively eliminates use of a multiplier circuit and logic associated therewith. Moreover, the present system function and performance advantages are achievable, at least in part, due to modifying conventional DCT/IDCT quantization implementation, particularly by using ROM look-up table or other functionally equivalent digital storage memory, instead of a conventional divider approach. As described further herein, the preferred approach uses a generic csa (Carry Save Adder) method and corresponding digital signal processing circuit logic to enable resource sharing, multiplexing or other substantially equivalent functional module re-use scheme between DCT/IDCT column or row value signal processing.

Figure 3:
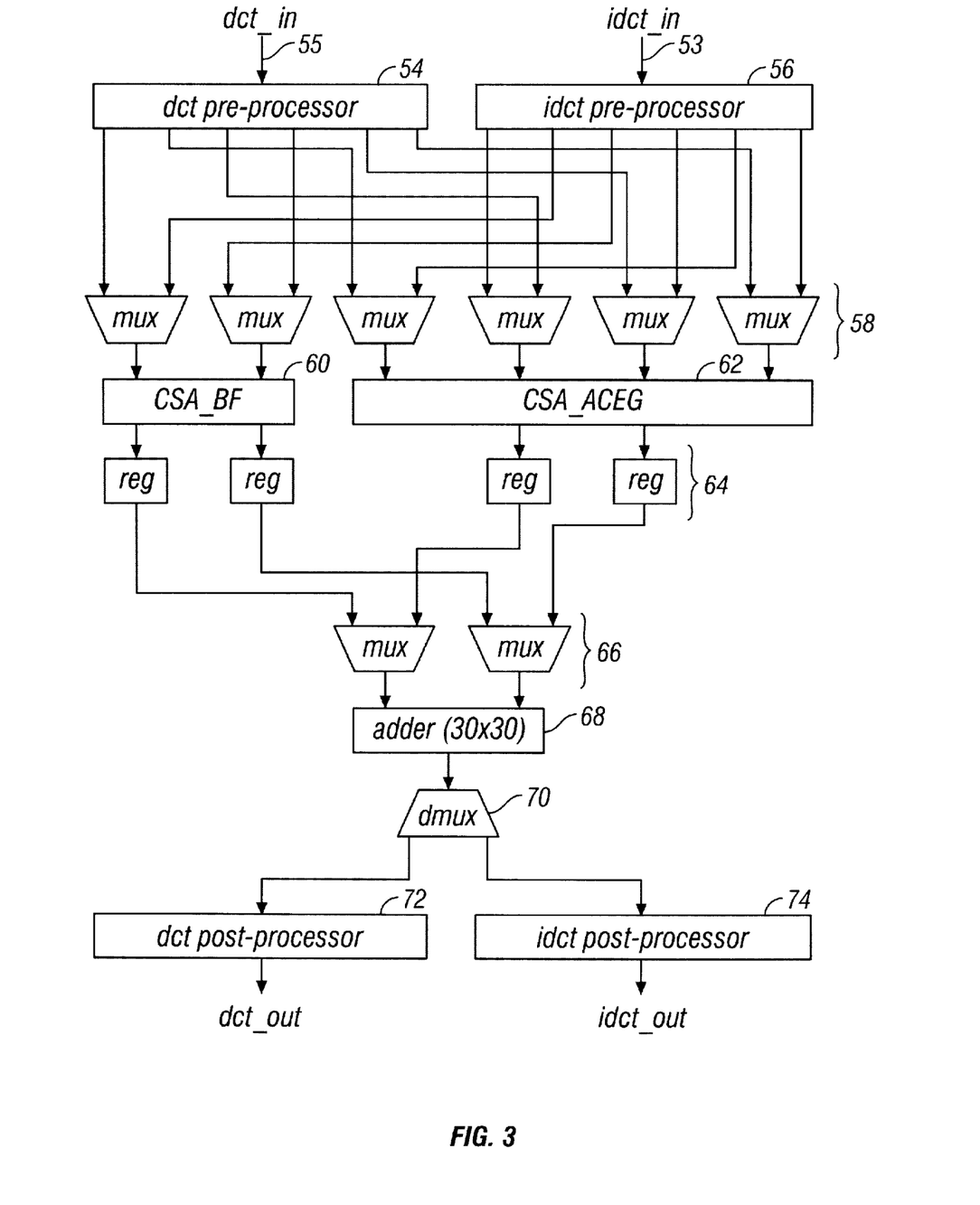
FIG. 3 shows a DCT/IDCT implementation using a CSA approach.

Referring now to FIG. 3, representative logical block diagram shows integrated DCT and IDCT system architecture for sharing certain signal processing facility by corresponding modules 8, 10. As shown, dct_in signal 55 and idct_in signal 53 are received respectively by dct pre-processor 55 and idct pre-processor 56, which both generate pre-processed signals applicable to multiplexers 58.

Then, according to one aspect of the present signal processing innovation, such multiplexers 58 apply multi-plexed signals to one or more Carry Save Adder (csa) module, including CSA_BF module 60 and CSA_ACEG module 62, as described further herein. CSA modules 60, 62 apply processed signal to registers 64 for facilitating single-cycle pipelined datapath implementation, which then apply signals to multiplexers 66. Further, multiplexers 66 apply signals to 30×30 adder module 68, which apply signal to multiplexer 70. Then, multiplexer 70 generates signals for dct post-processor module 72 and idct post-processor module 74.

In the preferred signal processing implementation shown, operation of DCT 8 effectively transforms eight-element vector signal into frequency domain. For example, assuming input vector is [x0, x1, x2, x3, x4, x5, x6, x7], and corresponding frequency vector is [y0, y1, y2, y3, y4, y5, y6, y7], then input vector is pre-processed into new vector [u0, u1, u2, u3, u4, u5, u6, u7], wherein:

$u0 = x0 + x7$ $u1 = x1 + x6$ $u2 = x3 + x4$ $u3 = x2 + x5$ $u4 = x0 - x7$ $u5 = x1 - x6$ $u6 = x2 - x5$ $u7 = x3 - x4$ (Note, $z = [x0, x1, \ldots xn] * [y0, y1, \ldots yn]$ represents vector production, and result is: $z = x0*y0 + x1*y1 + \ldots + xn*yn$.)

In the present example, DCT frequency vector may be calculated as follows:

$$y0=[D\ D\ D\ D\ 0\ 0\ 0\ 0\ ]*[u0\ u1\ u2\ u3\ u4\ u5\ u6\ u7]$$

$$y2=[B\ F\ -B\ -F\ 0\ 0\ 0\ 0\ ]*[u0\ u1\ u2\ u3\ u4\ u5\ u6\ u7]$$

$$y4=[D\ -D\ D-D\ 0\ 0\ 0\ 0\ ]*[u0\ u1\ u2\ u3\ u4\ u5\ u6\ u7]$$

$$y6=[F\ -B\ -F\ B\ 0\ 0\ 0\ 0\ ]*[u0\ u1\ u2\ u3\ u4\ u5\ u6\ u7]$$

$$y1=[0\ 0\ 0\ 0\ A\ C\ E\ G]*[u0\ u1\ u2\ u3\ u4\ u5\ u6\ u7]$$

$$y3=[0\ 0\ 0\ 0\ C\ -G\ -A\ -E]*[u0\ u1\ u2\ u3\ u4\ u5\ u6\ u7]$$

$$y5=[0\ 0\ 0\ 0\ E\ -A\ G\ C]*[u0\ u1\ u2\ u3\ u4\ u5\ u6\ u7]$$

$$y7=[0\ 0\ 0\ 0\ G\ -E\ C\ -A]*[u0\ u1\ u2\ u3\ u4\ u5\ u6\ u7]$$

where:

$A=0.6935$ $B=0.6533$ $C=0.5879$ $D=0.5000$ $E=0.3929$ $F=0.2706$ $G=0.1380$

Morover, in the preferred implementation, operation of IDCT 10 effectively transforms eight-element vector signal from frequency domain into real-time domain. Assuming input vector is [y0, y1, y2, y3, y4, y5, y6, y7] and corresponding real-time vector is [x0, x1, x2, x3, yx, x5, x6, x7], then IDCT 10 real-time vector is calculated as follows:

$$x0+x7=2*[D\ B\ D\ F\ 0\ 0\ 0\ 0]*[y0\ y1\ y2\ y3\ y4\ y5\ y6\ y7]$$

$$x1+x6=2*[D\ F-D\ -B\ 0\ 0\ 0\ 0]*[y0\ y1\ y2\ y3\ y4\ y5\ y6\ y7]$$

$$x2+x5=2*[D\ -F\ -D\ B\ 0\ 0\ 0\ 0]*[y0\ y1\ y2\ y3\ y4\ y5\ y6\ y7]$$

$$x3+x4=2*[D\ -B\ D\ -F\ 0\ 0\ 0\ 0]*[y0\ y1\ y2\ y3\ y4\ y5\ y6\ y7]$$

$$x0-x7=2*[0\ 0\ 0\ 0\ A\ C\ E\ G]*[y0\ y1\ y2\ y3\ y4\ y5\ y6\ y7]$$

$$x1-x6=2*[0\ 0\ 0\ 0\ C-G-A\ E]*[y0\ y1\ y2\ y3\ y4\ y5\ y6\ y7]$$

$$x2-x5=2*[0\ 0\ 0\ 0\ E-A\ G\ C]*[y0\ y1\ y2\ y3\ y4\ y5\ y6\ y7]$$

$$x3-x4=2*[0\ 0\ 0\ 0\ G-E\ C\ -A]*[y0\ y1\ y2\ y3\ y4\ y5\ y6\ y7]$$

Coefficients may use different bit allocations. Further, 12-bit allocation may be used for verification thereof. Preferably, IDCT operation complies with industry standard, such as IEEE 1800 specification. As assigned herein, following representative values are provided:

$A=12'hb10$ $B=12'ha74$ $C=12'h968$ $D=12'h800$ $E=12'h649$ $F=12'h454$ $G=12'h235$

Hence, in accordance with the important aspect of the present invention, particularly with respect to such DCT/IDCT numerical formulae are provided herein for corresponding row and column value determination. The MAC operation may be a variation of the following basic formulae. Preferably, such formulae are implemented using generic CSA (Carry Save Adder) method or other functionally comparable combinatorial logic having input signal shifting or selection capability.

$$(C,S)=A*w+C*x+E*y+G*z$$

or $$(C,S)=B*x+F*y$$

ACEG csa may use 12-bit accuracy for coefficients. This method is a generic cas which converts 21 inputs to 2 outputs. Coefficients A, C, E, and G are 12 bit. The preferred basic format follows:

$$(C,S)=A*w+C*x+E*y+G*z$$

where: w, x, y and z are 16-bit signed integers. For example, to enable sharing between IDCT 10 and DCT 8 operations, such method may be assigned a 17-bit width.

As described further herein, CSA_BF module 60 (i.e., having 5 csa stages) and CSA_ACEG module 62 (i.e., having 7 csa stages) effectively function according to foregoing CSA formulae and generic method, and are selectable for resource sharing according to present invention using appropriate multiplexing circuits. For example, as illustrated in the following representative multi-stage signal processor system design, CSA functionality may be achieved with module having inputs w, y, z, and outputs s, c.

As shown in the following representative functionality or enabling hardware-description calculations, seven signal-processing stages are employed by the system or associated functional modules shown in FIG. 3 for signal-processing ACEG csa, with a total of 21 gates delays.

First stage: 21 inputs & 14 outputs (3 gates delay)

The 21 inputs to first-stage csa are primary inputs, having left-shift derivatives:

(Note: Symbols {} represent concatenation operation in following:

Let $x=[x0, x1, \ldots, xn]$ and $y=[y0, y1, \ldots, ym]$.

Then, $z=\{x, y\}=[x0, x1, \ldots, xn, y0, y1, \ldots, ym])$.

$w0[16:0]=w[16:0]$ $w1[19:0]=\{w[16:0],3'b000\}$ $w2[20:0]=\{w[16:0],4'b0000\}$ $w3[24:0]=\{w[16:0],8'b0000\_0000\}$ $w4[25:0]=\{w[16:0],9'b0\_0000\_\}$ $w5[27:0]=\{w[16:0],11'b000\_0000\_0000\}$ $x0[19:0]=\{x[16:0],3'b000\}$ $x1[21:0]=\{x[16:0],5'b0\_0000\}$ $x2[22:0]=\{x[16:0],6'b00\_0000\}$ $x3[24:0]=\{x[16:0],8'b0000\_0000\}$ $x4[27:0]=\{x[16:0],11'b0000\_0000\}$ $y0[16:0]=y[16:0]$ $y1[19:0]=\{y[16:0],3'b000\}$ $y2[22:0]=\{y[16:0],6'b00\_0000\}$ $y3[25:0]=\{y[16:0],9'b0\_0000\_0000\}$ $y4[26:0]=\{y[16:0],10'b00\_0000\_0000\}$ $z0[16:0]=z[16:0]$ $z1[18:0]=\{z[16:0],2'b000\}$ $z2[20:0]=\{z[16:0],4'b0000\}$ $z3[21:0]=\{z[16:0],5'b0\_0000\}$ $z4[25:0]=\{z[16:0],9'b0\_0000\_0000\}$ (Note: as understood herein, basic carry-save-adder (CSA) functions, for example, by taking three inputs, and generates two outputs. Hence, assuming three inputs, x, y, and z, then two outputs c and s from CSA are calculated as follows:

$s = x \wedge y \wedge z$ $c = (x\ \&\ y) | (x\ \&\ y) | (y\ \&\ z)$

Symbol "=>" represents such CSA operation.
For example, $S00$: CSA of $(w0, y0, z0) => (s,00,c00)$ Then $s00 = w0 \wedge y0 \wedge z0$ $c00 = (w0\ \&\ y0)|(w0\ \&\ z0)|(y0\ \&\ z0))$.

The 14 outputs first stage are csa results of 21 inputs:

$S00$: CSA of $(w0[16:0], y0[16:0], z0[16:0]) => (s00[16:0], c00[16:0])$ $S01$: CSA of $(w1[19:2], x0[19:2], z1[18:2]) => (s01[17:0], c01[17:0])$ $S02$: CSA of $(w2[20:3], y1[19:3], z2[20:3]) => (s02[17:0], c02[17:0])$ $S03$: CSA of $(x1[21:5], x2[22:5], z3[21:5]) => (s03[17:0], c03[17:0])$ $S04$: CSA of $(w3[24:6], x3[24:6], y2[22:6]) => (s04[18:0], c04[18:0])$ $S05$: CSA of $(w4[25:9], y3[25:9], z4[25:9]) => (s05[16:0], c05[16:0])$ $S06$: CSA of $(w5[27:10], x4[27:10], y4[27:10]) => (s06[17:0], c06[17:0])$

Second Stage: 14 inputs & 10 outputs (3 gates delay)
There are 14 inputs to second-stage csa, which are primary outputs from firststage csa, having left-shift derivatives:

$t00[16:0]=s00[16:0]$ $d00[17:0]=\{c00[16:0],1'h0\}$ $t01[19:0]=\{s01[17:0],2'h0\}$ $d01[20:0]=\{c01[17:0],3'h0\}$ $t02[20:0]=\{s02[17:0],3'h0\}$ $d02[21:0]=\{c02[17:0],4'h0\}$ $t03[22:0]=\{s03[17:0],5'h0\}$ $d03[23:0]=\{c03[17:0],6'h00\}$ $t04[24:0]=\{s04[18:0],6'h00\}$ $d04[25:0]=\{c04[18:0],7'h00\}$ $t05[25:0]=\{s05[16:0],9'h000\}$ $d05[26:0]=\{c05[16:0],10'h000\}$ $t06[27:0]=\{s06[17:0],10'h000\}$ # skipped second stage $d06[28:0]=\{c06[17:0],11'h000\}$ # skipped second stage The 10 outputs from second stage are csa results of 14 inputs:

$S10$: CSA of $(t00[16:0], d00[17:0], t01[19:0]) => (s10[19:0], c10[19:0])$ $S11$: CSA of $(d01[20:3], d02[21:3], d02[21:3]) => (s11[18:0], c11[18:0])$ $S12$: CSA of $(t03[22:5], d03[23:5], t04[24:5]) => (s12[19:0], c12[19:0])$ $S13$: CSA of $(d04[25:7], t05[25:7], d05[26:7]) => (s13[19:0], c13[19:0])$ $t06[27:0]=(s06[17:0],10'h000)$# skipped second stage $d06[28:0]=(c06[17:0],11'h000)$# skipped second stage Third Stage: 10 inputs & outputs (3 gates delay)
There are 10 inputs to third stage csa. They are primary outputs from second stage, having left-shift derivatives:

$t10[19:0]=s10[19:0]$ $d10[20:0]=\{c10[19:0],1'h0\}$ $t11[21:0]=\{s11[18:0],3'h0\}$ $d11[22:0]=\{c11[18:0],4'h0\}$ $t12[24:0]=\{s12[19:0],5'h00\}$ $d12[25:0]=\{c12[19:0],6'h00\}$ $t13[26:0]=\{s13[19:0],7'h00\}$ $d13[27:0]=\{c13[19:0],8'h00\}$ $t06[27:0]=\{s06[17:0],10'h000\}$# taken from second stage $d06[28:0]=\{c06[17:0],11'h000\}$# taken from second stage The 7 outputs from third stage are csa results of 10 inputs:

$S20$: CSA of $(t10[19:0], d10[20:0], t11[21:0]) => (s20[21:0], c20[21:0])$ $S21$: CSA of $(d11[22:4], t12[24:4], d12[25:4]) => (s21[21:0], c20[21:0])$ $S22$: CSA of $(t13[26:7], d13[27:7], t06[27:7]) => (s22[20:0], c22[20:0])$ $d06[28:0]=(c06[17:0], 11'h000)$ # taken from second stage, skipped Fourth Stage: 7 inputs & 5 outputs (3 gates delay)
There are 7 inputs to fourth-stage csa. They are primary outputs from third stage, having left-shift derivatives:

$t20[21:0]=s20[21:0]$ $d20[22:0]=\{c20[21:0],1'h0\}$ t21[25:0]={s21[21:0],4'h0} d21[26:0]={c21[21:0],5'h00} t22[27:0]={s22[20:0],7'h00} d22[28:0]={c22[20:0],8'h00} d06[28:0]={s06[17:0],11'h000}# taken from second stage,skipped

The 5 outputs from third stage are csa results of 7 inputs:

S30: CSA of (t20[21:0], d20[22:0], t21[25:0])=>(s30[25:0], c30[25:0])

S31: CSA of (d21[26:5], t22[27:5], d22[28:5])=>(s31[23:0], c31[23:0])

d06[28:0]=(c06[17:0], 11'h000)# taken from second stage, skipped

Fifth Stage: 5 inputs & 4 outputs (3 gates delay)
There are 5 inputs to fifth stage csa. They are primary outputs from fourth stage, having left-shift derivatives:

t30[25:0]=s30[25:0]

d30[26:0]={c30[25:0],1'h0} t31[28:0]={s31[23:0],5'h0} d31[29:0]={c31[23:0],6'h00} d14[28:0]={c06[17:0],11'h000}# taken from second stage, skipped

The 5 outputs from fifth stage are csa results of 5 inputs:

S40: CSA of (t30[25:0], d30[26:0], t3[28:0]=>(s40[28:0], c40[28:0])

d31[29:0]={c31[24:0],6'h00} d06[28:0]={c06[17:0],11'h000}# taken from second stage, skipped

Sixth Stage: 4 inputs & 3 outputs (3 gates delay)
There are 4 inputs to sixth-stage csa, which are primary outputs from fifth stage, having left-shift derivatives:

t40[28:0]=s40[28:0]

d40[29:0]={c40[28:0],1'h0} d31[29:0]={s31[23:0],6'h0} d14[28:0]={c06[17:0],11'h000}# taken from second stage, skipped

The 3 outputs from sixth stage are csa results of 4 inputs:

S50: CSA of (t40[28:0], d14[28:0], t40[29:0]=>(s50[29:0], c50[29:0])

d31[29:0]=(s31[23:0],6'h00)

Seventh Stage: 3 inputs & 2 outputs (3 gates delay)
There are 3 inputs to seventh-stage csa. They are primary outputs from sixth stage, having left-shift derivatives:

t50[29:0]=s50[29:0]

d50[30:0]={c50[29:0],1'h0} d31[29:0]={c31[23:0],6'h00}

The 2 outputs from seventh stage are csa results of 3 inputs:
S60: CSA of (t50[29:0], d50[30:0], d3[29.0]=>(S_aceg[30:0], C_aceg[30:0]) S_aceg[30:0] and C_aceg[30:0] are two final output signals applicable from ACEG CSA 62. Two variables are fed into 30-bit adder 68. The most significant 28-bits of S_aceg and C_aceg are valid bits in case of the operation of DCT 8. The least significant 3-bits is truncated. In case of the operation of IDCT 10, the least 29-bits of S_aceg and the least 28-bits of C_aceg are valid bits. Other bits may not be used in the 30-bit adder 68.

BF csa 60 uses 12-bit accuracy for coefficients. This is generic csa function which converts 10 inputs to 2 outputs. Coefficients B and F are 12-bit width. Basic format follows:

$$(C,S)=B*x+F*y$$

where x and y are 18-bit signed integers.

There are five csa calculation stages with a total of 15-gate delay.

First Stage: 10 inputs & 7 outputs (3 gates delay)
The 10 inputs to first stage csa are primary inputs and left-shift derivatives.

x0[17:0]=x[17:0]

x1[19:0]={x[17:0], 2'h00} x2[20:0]={x[17:0], 3'h00} x3[21:0]={x[17:0], 4'h00} x4[24:0]={x[17:0], 7'h000} x5[26:0]={x[17:0], 9'h000} y0[17:0]=y[17:0]

y1[19:0]={bf_y[17:0], 3'h00} y2[21:0]={bf_y[17:0], 8'h000}

The 7 outputs from first stage are csa results of 10 inputs.

S00: CSA of (x0[17:0], y0[17:0], x1[19:0])=>(bf_s00[19:0], bf_c00[19:0])

S01: CSA of (x2[20:2], y1[19:2], x3[21:2])=>(bf_s01[19:0], bf_c01[19:0])

S02: CSA of (x4[24:7], y3[25:7], x5[26:7])=>(bf_s02[19:0], bf_c02[19:0])

y2[21:0]=(bf_y[17:0], 4'h00)

Second Stage: 7 inputs & 5 outputs (3 gates delay)
The 7 inputs to second stage csa are outputs from first stage csa and left-shift derivatives.

t00[19:0]=bf_s00[19:0]

d00[20:0]={bf_c00[19:0], 1'h0} t01[21:0]={bf_s01[19:0], 2'h00} d01[22:0]={bf_c01[19:0], 3'h00} t02[26:0]={bf_s02[19:0], 7'h00} d02[27:0]={bf_c02[19:0], 8'h00} y2[21:0]={bf_y[17:0], 4'h00}

The 5 outputs from second stage are csa results of 7 inputs.

S10: CSA of (t00[19:0], d00[20:0], t01[21:0])=>(bf_s10[21:0], bf_c10[21:0])

S11: CSA of (y2[21:3], d01[22:3], t02[26:3])=>(bf_s11[23:0], bf_c11[23:0])

d02[27:0]=(bf_c02[19:0], 8'h00)

Third Stage: 5 inputs & 4 outputs (3 gates delay)

The 5 inputs to third stage csa are outputs from second stage csa and left-shift derivatives.

t10[21:0]=bf_s10[21:0]

d10[22:0]={bf_c10[21:0], 1'h0} t11[26:0]={bf_s11[23:0], 3'h0} d11[27:0]={bf_c11[23:0], 3'h0} d02[27:0]={bf_c02[19:0], 9'h00}

The 4 outputs from third stage are csa results of 5 inputs.

S20: CSA of (t10[21:0], d10[22:0], t11[26:0])=>(bf_s20[26:0], bf_c20[26:0])

d11[27:0]=(bf_c11[23:0], 4'h0)

d02[27:0]=(bf_c02[19:0], 8'h00)

Fourth Stage: 4 inputs & 3 outputs (3 gates delay)

The 4 inputs to fourth stage csa are outputs from third stage csa and left-shift derivatives.

t20[26:0]=(bf_s20[26:0]

d20[27:0]={bf_c20[26:0], 1'h0} d11[27:0]={bf_c02[19:0], 8'h00} d02[27:0]={bf_c02[19:0], 8'h00}

The 3 outputs from fourth-stage are csa results of 4 inputs.

S30: CSA of (t20[26:0], d20[27:0], d11[27:0])=>(bf_s30[27:0], bf_c30[27:0])

d02[27:0]=(bf_c02[19:0], 8'h00)

Fifth Stage: 3 inputs & 2 outputs (3 gates delay)

The 3 inputs to fifth stage csa are outputs from fourth stage csa and left-shift derivatives.

t30[27:0]=(bf_s30[27:0]

d30[28:0]={bf_c30[27:0], 1'h0} d02[27:0]={bf_c02[19:0], 8'h000}

The 2 outputs from fifth stage are csa results of 3 inputs.
S40: CSA of (t30[27:0], d30[28:0], d20[27:0])=>(S_bf[28:0], C_cf[28:0])
S_bf[28:0] and C_bf[28:0] are two final output signals applicable from BF CSA 60. Two variables are provided to 30-bit adder 68, which is preferably shared with ACEG CSA 62.

Effectively to accelerate DCT 8 and IDCT 10 processing performance and reduce register usage, input sequence to DCT 8/IDCT 10 may be re-arranged. Assuming input 8×8 matrix elements are: x00 x01 x02 x03 x04 x05 x06 x07 x10 x11          x17 x70 x71          x77

Re-arranged input sequence to DCT/IDCT follow:

x01 x03 x05 x07 x00 x04 x02 x06 x11 x13          x16 x71 x73          x76

Additional logic are implemented to share two generic CSA functional modules for DCT 8 and IDCT 10. Such logic include multiplex operations. 4-bit counter, pix_cnt, labels input data with positions in sequence. Accordingly, pix_cnt values may be manipulated to generate control signals for mixing thereto.

Figure 4:
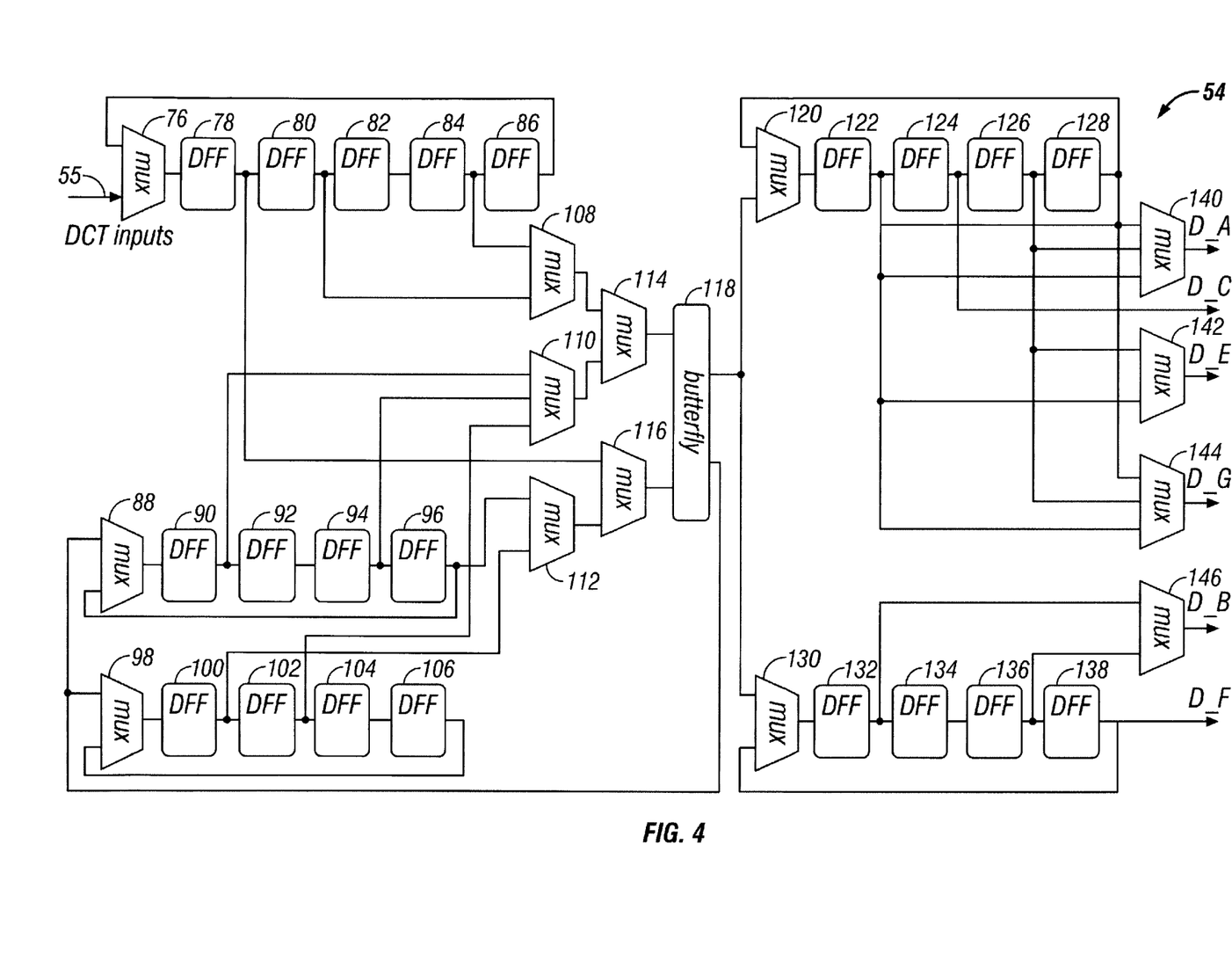
FIG. 4 illustrates a DCT pre-processor for CSA operation.

DCT 8 inputs are pre-processed prior to CSA operations. More particularly, FIG. 4 illustrates preferred implementation for micro-architecture or effective logic functionality for DCT pre-processor 54 according to important aspects of the present invention. Initially, pre-processor 54 takes primary 8×8 element input signals, and generates therefrom 6 output signals, D_A, D_C, D_E, D_G, D_B, and D_F.

As shown, input dct_in signal 55 is received by multiplexer 76, then D-type flip-flop circuits 78, 80, 82, 84, 86, arranged serially, which couple further to multiplexers 88, 98, shown respectively connected to DFF's 90, 92, 94, 96 and DEF's 100, 102, 104, 106. In such arrangement, certain such DFF output signals are coupled further to multiplexers 108, 110, 112, which particularly couple further to multiplexers 114, 116, then to butterfly circuit 118.

Output of butterfly 118 couples back to multiplexers 98, 88 and also to multiplexers 120, 130, which respectively couple to DFF's 122, 124, 126, 128 and DFF's 132, 134, 136, 138. Then, certain such DFF output signals are coupled to multiplexers 140, 142, 144, 146.

Generally, as shown, output variable signals from pre-processor 54 are muxed 58 with IDCT pre-processor outputs. Mux 58 output are fed into CSA_ACEG 62 and CSA_BF 60. DCT post-processor 72 is effectively multiplexer operation for implementing present invention.

Note that IDCT pre-processor 56 is relatively simpler compared to DCT pre-preprocessor 54. Preferred embodiment of pre-processor 56 effectively includes serial-to-parallel conversion logic with 4 DFF and input mux selector. When four IDCT inputs are available, CSA logic 60, 62 generate ACEG and BF coefficient value signals.

Figure 5:
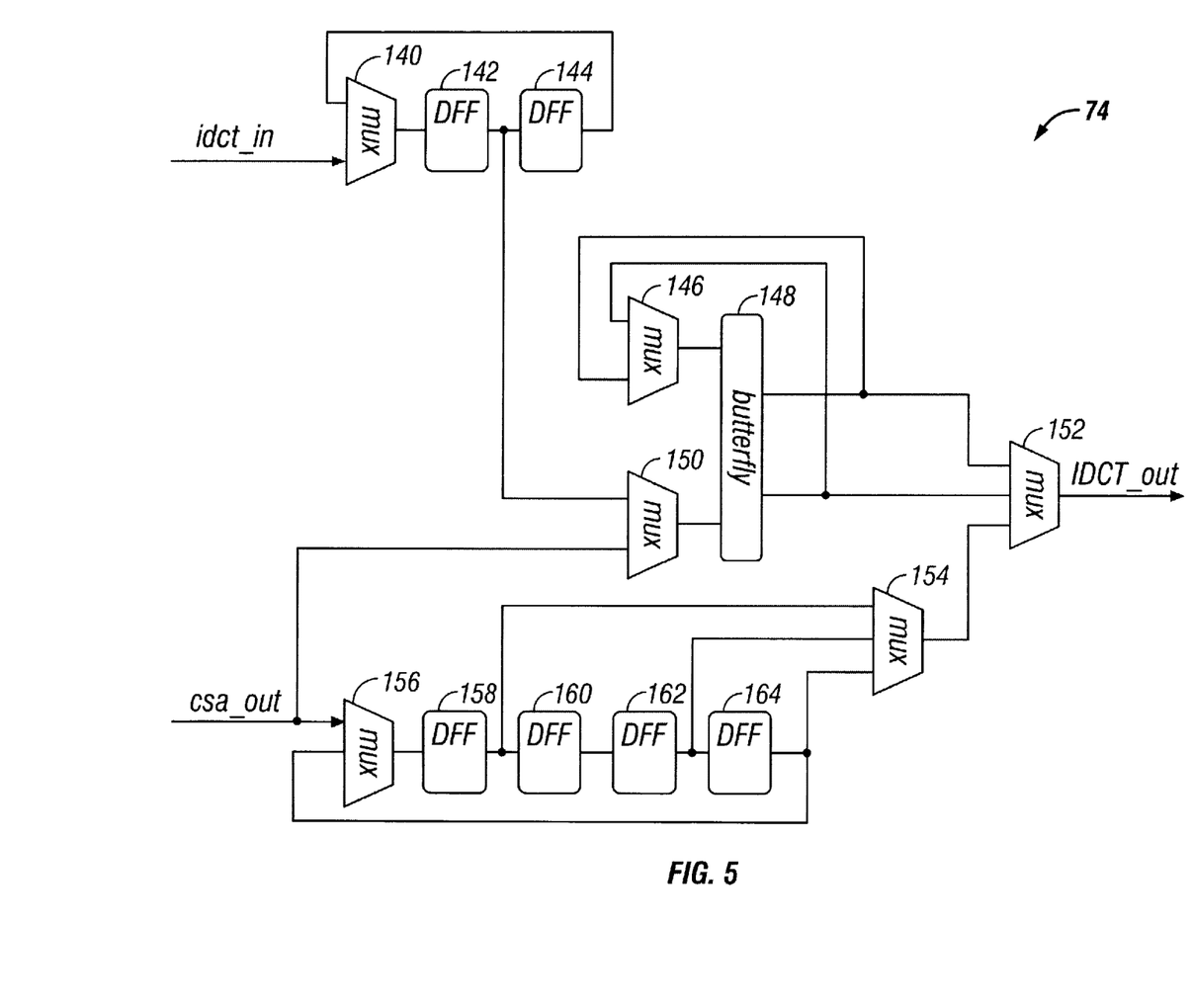
FIG. 5 shows a DCT post-processor from CSA operation.

FIG. 5 illustrates preferred implementation for IDCT post-processor 74, including butterfly 148 and multiplexer operations. Here, idct_in signal is received by multiplexer 140, then coupled to DFF 142 and DFF 144. DFF applies signal to multiplexer 140. Additionally, csa_out signal is applied to multiplexer then coupled in series to DFFs 158, 160, 162, 164, as well as to multiplexer 150, which receives signal from DFF 142. Butterfly module 146 receives signal from multiplexers 150, 146, and generates signals applied to multiplexer 146 and multiplexer 152. Multiplexer 154 receives signals from DFFs 158, 162, 164, and applies signal to multiplexer 152, which generates idct_out signal. DFF applies signal as well to multiplexer 156.

The foregoing described embodiments of the invention are provided as an illustration and description of enabling implementation at logic and/or gate functional level. It is not intended to limit the invention to the precise form described. Other variations and embodiments are possible in light of the above teaching, and it is thus intended that the scope of the invention not be limited by the detailed description, but rather by the claims as follow.

We claim:

1. An MPEG-compliant video processing unit for both signal encoding and decoding comprising a Discrete Cosine Transform/Inverse Discrete Cosine Transform (DCT/IDCT) function module, a Quantization/Inverse Quantization (QNT/IQ) function module, a Variable Length Coder (VLC) function module, a Variable Length Decoder (VLD) function module, and a Motion Compensation (MC) function module, wherein the DCT/DCT module, the QNT/IQ module, the MC module, an (SBUF) buffer module, an (MBUF) buffer module, a (CFIFO) buffer module, a (VBUF) buffer module, and a (TBUF) buffer module are shared between an encoding mode and a decoding mode; and wherein the (SBUF) module stores and processes a reconstructed video bit stream and the (CFIFO) module stores and processes a compressed MPEG video bit stream.

2. The video processing unit of claim 1 wherein during the encoding mode, an input of the video processing unit comprises an uncompressed video data, and wherein during the decoding mode, the input comprises an MPEG compressed video data.

3. The video processing unit of claim 1 further comprising an (ABUF) buffer module wherein the (ABUF) module generates a decimated video stream.

4. The video processing unit of claim 1 further comprising an (MBS) buffer module wherein an output of the (MBS) buffer module is coupled to the VLC module and the IQ module.

5. The video processing unit of claim 1 wherein during the encoding mode the (SBUF) module and the (CFIFO) module provide the respective video bit stream to one or more buffers coupled to a (DBUS), during the decoding mode the (CFIFO) module provides the MPEG compressed video bit stream to a Variable Length Decoding (VLD) module, and during the decoding mode the (SBUF) module provides the reconstructed video bit stream to an SDRAM module.

6. The video processing unit of claim 1 wherein during the encoding mode the (VBUF) module provides a signal to an adder module, and during the decoding mode the (VBUF) module provides a signal to the QNT/IQ module.

7. The video processing unit of claim 1 wherein during the DCT/IDCT module comprises a multi-stage (CSA_BF) function module, a multi-stage (CSA_ACEG) function module, a first multiplexor array, a second multiplexor array, a DCT pre-processor function module, a DCT post-processor function module, and IDCT pre-processor function module, and an IDCT post-processor function module.

8. The video processing unit of claim 7 wherein the first multiplexor array provides signals to the (CSA_BF) module and the (CSA_ACEG) module; and the (CSA_BF) module and the (CSA_ACEG) module provide signals to the second multiplexor array.

9. The video processing unit of claim 7 wherein during the encoding mode an input of the DCT/IDCT module is provided to the DCT pre-processor module, the DCT pre-processor module provides signals to the first multiplexor array; and the second multiplexor array provides signals to the DCT post-processor.

10. The video processing unit of claim 7 wherein during the decoding mode an input of the DCT/IDCT module is provided to the IDCT pre-processor module, the IDCT pre-processor module provides signals to the first multiplexor array, and the second multiplexor array provides signals to the IDCT post-processor.

11. The MPEG-compliant video processing unit of claim 1 wherein the DCT/IDCT module comprises one or more carry save adders (csa's).

12. An MPEG-compliant video processing system for both signal encoding and decoding comprising the steps of:
processing a signal in compliance with an MPEG format to generate an encoded signal when the MPEG-compliant video processing system is operating in an encoding mode and a decoded signal when the MPEG-compliant video processing system is operating in a decoding mode; wherein if the signal is an uncompressed video data, then performing a Discrete Cosine Transform in the functional re-use DCT/IDCT module and generating an encoded signal;

if the signal is an MPEG compressed video data, then performing an Inverse Discrete Cosine Transform in the DCT/IDCT module and generating a decoded signal; and wherein shared functional units for both signal encoding and decoding comprise a Discrete Cosine Transform/ Inverse Discrete Cosine Transform (DCT/IDCT) function module, a Quantization/Inverse Quantization (QNT/IQ) function module, a Motion Compensation (MC) function module, an (SBUF) buffer module, an (MBUF) buffer module, a (CFIFO) buffer module, a (VBUF) buffer module, and a (TBUF) buffer module, and wherein the (SBUF) module stores and processes a reconstructed video bit stream, and the (CFIFO) module stores and processes a compressed MPEG video bit stream.

13. The video processing method of claim 12 further comprising an (ABUF) buffer module wherein the (ABUF) module generates a decimated video stream.

14. The video processing method of claim 12 further comprising an (MBS) buffer module wherein an output of the (MBS) buffer module is coupled to the VLC module and the IQ module.

15. The video processing method of claim 12, wherein during the encoding mode the (SBUF) module and the (CFIFO) module provide the respective video bit stream to one or more buffers coupled to a (DBUS), during the decoding mode the (CFIFO) module provides the MPEG compressed video bit stream to a Variable Length Decoding (VLD) module, and during the decoding mode the (SBUF) module provides the reconstructed video bit stream to an SDRAM module.

16. The video processing method of claim 12 wherein during the encoding mode the (VBUF) module provides a signal to an adder module, and during the decoding mode the (VBUF) module provides a signal to the QNT/IQ module.

17. The video processing method of claim 12 wherein the DCT/IDCT module comprises a multi-stage (CSA_BF) function module, a multi-stage (CSA_ACEG) function module, a first multiplexor array, a second multiplexor array, a DCT pre-processor function module, a DCT post-processor function module, an IDCT pre-processor function module, and an IDCT post-processor function module.

18. The video processing method of claim 17 wherein the first multiplexor array provides signals to the (CSA_BF) module and the (CSA_ACEG) module, and the (CSA_BF) module and the (CSA_ACEG) module provide signals to the second multiplexor array.

19. The video processing method of claim 18 wherein during the encoding mode an input of the DCT/IDCT module is provided to the DCT pre-processor module, the DCT pre-processor module provides signals to the first multiplexor array, and the second multiplexor array provides signals to the DCT post-processor.

20. The video processing method of claim 18 wherein during a the decoding mode an input of the DCT/IDCT module is provided to the IDCT pre-processor module, the IDCT pre-processor module provides signals to the first multiplexor array, and the second multiplexor array provides signals to the IDCT post-processor.

21. An MPEG-compliant video processing unit for both signal encoding and decoding comprising a Discrete Cosine Transform/Inverse Discrete Cosine Transform (DCT/IDCT) function module, a Quantization/Inverse Quantization (QNT/IQ) function module, a Variable Length Coder (VLC) function module, a Variable Length Decoder (VLD) function module, and a Motion Compensation (MC) function module.

wherein the DCT/DCT module, the QNT/IQ module, the MC module, an (SBUF) buffer module, an (MBUF) buffer module, a (CFIFO) buffer module, a (VBUF) buffer module, and a (TBUF) buffer module are shared between an encoding mode and a decoding mode; and wherein during the encoding mode the (VBUF) module provides a signal to an adder module, and during the decoding mode the (VBUF) module provides a signal to the QNT/IQ module.

22. An MPEG-compliant video processing system for both signal encoding and decoding comprising the steps of:

processing a signal in compliance with an MPEG format to generate an encoded signal when the MPEG-compliant video processing system is operating in an encoding mode and a decoded signal when the MPEG-compliant video processing system is operating in a decoding mode; wherein if the signal is an uncompressed video data, then performing a Discrete Cosine Transform in the functional re-use DCT/IDCT module; and generating an encoded signal;

if the signal is an MPEG compressed video data, then performing an Inverse Discrete Cosine Transform in the DCT/IDCT module and generating a decoded signal; and wherein shared functional units for both signal encoding and decoding comprise a Discrete Cosine Transform/Inverse Discrete Cosine Transform (DCT/IDCT) function module, a Quantization/Inverse Quantization (QNT/IQ) function module, a Motion Compensation (MC) function module, an (SBUF) buffer module, an (MBUF) buffer module, a (CFIFO) buffer module, a (VBUF) buffer module, and a (TBUF) buffer module; and wherein during the encoding mode the (VBUF) module provides a signal to an adder module, and during the decoding mode the (VBUF) module provides a signal to the QNT/IQ module.

* * * * *